US012600863B2

(12) United States Patent
Kato et al.

(10) Patent No.: US 12,600,863 B2
(45) Date of Patent: Apr. 14, 2026

(54) MOLDED BODY, METHOD OF PRODUCING THE SAME, AND RECYCLING METHOD

(71) Applicant: TOYOTA BOSHOKU KABUSHIKI KAISHA, Aichi (JP)

(72) Inventors: Keisuke Kato, Toyota (JP); Toshiyuki Ario, Ogaki (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 170 days.

(21) Appl. No.: 18/385,445

(22) Filed: Oct. 31, 2023

(65) Prior Publication Data

US 2024/0150579 A1     May 9, 2024

(30) Foreign Application Priority Data

Nov. 4, 2022     (JP) .................................. 2022-177084

(51) Int. Cl.
*C08L 101/06*          (2006.01)
*B32B 5/20*            (2006.01)
(Continued)

(52) U.S. Cl.
CPC .............. *C08L 101/06* (2013.01); *B32B 5/20* (2013.01); *B32B 27/065* (2013.01); *B32B 27/32* (2013.01);
(Continued)

(58) Field of Classification Search
CPC . B29B 17/0042; B29B 17/04; B32B 2250/03; B32B 2250/40; B32B 2266/025;
(Continued)

(56) References Cited

U.S. PATENT DOCUMENTS 5,148,993 A * 9/1992 Kashiwagi .............. B03B 9/061
                                                          241/DIG. 38
9,353,251 B2 5/2016 Kito et al.
(Continued)

FOREIGN PATENT DOCUMENTS

CN           110612226 A      12/2019
JP        2002-361799 A       12/2002
(Continued)

OTHER PUBLICATIONS

Office Action for CN App. No. 202311432644.3, dated Sep. 24, 2025 (w/ translation).
(Continued)

*Primary Examiner* — Hai Vo
(74) *Attorney, Agent, or Firm* — GREENBLUM & BERNSTEIN, P.L.C.

(57)          ABSTRACT

A molded body includes a non-foamed design layer, a foamed intermediate layer, and a non-foamed back layer, laminated in this order and formed of a first, second, and third resin compositions, respectively. The first, second, and third resin compositions contain a polyolefin as a main component. The first resin composition is an impact-resistant resin composition including a polyolefin, a polyamide, and a polyolefin-based modified elastomer having a reactive group reactive with the polyamide. A method of producing the molded body includes disposing a first support layer to serve as the design layer and a third support layer to serve as the back layer so as to be spaced apart from and face each other, interposing the second resin composition provided with foamability in a gap between the first and third support layers, and forming the intermediate layer by expanding the gap while causing the second resin composition to foam.

6 Claims, 3 Drawing Sheets

(51) Int. Cl.

| | |
|---|---|
| *B32B 27/06* | (2006.01) |
| *B32B 27/32* | (2006.01) |
| *B32B 27/34* | (2006.01) |
| *B32B 37/15* | (2006.01) |
| *C08J 9/34* | (2006.01) |
| *C08J 11/06* | (2006.01) |
| *C08L 23/00* | (2006.01) |
| *C08L 77/00* | (2006.01) |

(52) U.S. Cl.
CPC .............. *B32B 27/34* (2013.01); *B32B 37/15* (2013.01); *C08J 9/34* (2013.01); *C08J 11/06* (2013.01); *C08L 23/00* (2013.01); *C08L 77/00* (2013.01); *B32B 2250/03* (2013.01); *B32B 2250/40* (2013.01); *B32B 2266/025* (2013.01); *B32B 2270/00* (2013.01); *B32B 2307/558* (2013.01); *B32B 2323/00* (2013.01); *B32B 2377/00* (2013.01); *C08J 2300/106* (2013.01); *C08J 2323/00* (2013.01); *C08J 2400/106* (2013.01); *C08J 2423/00* (2013.01)

(58) Field of Classification Search
CPC .......... B32B 2270/00; B32B 2307/558; B32B 2323/00; B32B 2377/00; B32B 27/065; B32B 27/32; B32B 27/34; B32B 37/15; B32B 5/20; C08J 11/06; C08J 2300/106; C08J 2300/30; C08J 2323/00; C08J 2323/02; C08J 2400/106; C08J 2423/00; C08J 9/34; C08L 101/06; C08L 2207/20; C08L 23/00; C08L 77/00; Y02W 30/62

See application file for complete search history.

(56) References Cited

U.S. PATENT DOCUMENTS

| | | | | |
|---|---|---|---|---|
| 10,934,424 | B2 | 3/2021 | Kito et al. | |
| 2014/0364569 | A1 | 12/2014 | Kito et al. | |
| 2018/0334560 | A1 | 11/2018 | Kito et al. | |
| 2019/0022903 | A1* | 1/2019 | Kito ....................... | C08L 77/06 |
| 2020/0079189 | A1 | 3/2020 | Kito et al. | |

FOREIGN PATENT DOCUMENTS

| | | | |
|---|---|---|---|
| JP | | 2006-175825 A | 7/2006 |
| JP | | 2008-062405 A | 3/2008 |
| JP | | 2019-206679 A | 12/2019 |
| JP | | 2022-163991 A | 10/2022 |
| WO | WO 2013/094764 A1 | | 6/2013 |
| WO | WO 2017/094737 A1 | | 6/2017 |
| WO | WO 2017/155114 A1 | | 9/2017 |

OTHER PUBLICATIONS

Office Action for JP App. No. 2022-177084, dated Feb. 10, 2026 (w/ translation).

\* cited by examiner

MOLDED BODY, METHOD OF PRODUCING THE SAME, AND RECYCLING METHOD

CROSS REFERENCE TO RELATED APPLICATIONS

The present application claims priority under 35 USC § 119 to Japanese Patent Application No. 2022-177084 filed on Nov. 4, 2022, the disclosure of which is hereby expressly incorporated by reference in its entirety.

BACKGROUND OF THE INVENTION

(1) Field of the Invention

The present invention relates to a molded body, a method of producing the molded body, and a recycling method. More specifically, the present invention relates to a molded body formed using a polyolefin-based recycled resin, a method of producing the molded body, and a recycling method.

(2) Description of Related Art

WO 2013/094764 and WO 2017/094737 disclose resin compositions provided with impact resistance by using a polyolefin, a polyamide, and a modified elastomer having a reactive group reactive with the polyamide. JP 2019/206679 A discloses a molded body formed by using, as a recycled material, such a resin composition provided with impact resistance, and a method of producing the molded body.

SUMMARY OF THE INVENTION

Mixed resins, that is, resin alloys, having high performance obtained by combining various resins or the like, are typically used. Although the resin alloys can exhibit excellent performance, the resin alloys have problems in terms of reusability due to unevenness in compositions, properties, and the like. Therefore, in recent years, from the viewpoint of improving recyclability of resin products, there is an increasing demand for resin products formed by using a single resin species, i.e., mono-material resin products.

In this regard, the resin compositions disclosed in WO 2013/094764 and WO 2017/094737 are extremely excellent materials from the viewpoint of resin performance and provision of mono-material resin products, because these resin compositions can exhibit excellent impact resistance even when having a high polyolefin concentration. Furthermore, it is found that these resin compositions can be advantageously reused by using the technology disclosed in JP 2019/206679 A.

Actually, however, the production amounts of these resin compositions at present are limited, and the amount of these resin compositions produced so far is not large. Therefore, even if polyolefin-based recycled resins in which these resin compositions are used are produced, it is difficult to obtain such a polyolefin-based recycled resin in an amount sufficient for mass production of resin products.

The present invention has been made in view of the above circumstances, and an object of the present invention is to provide a molded body which can be mass-produced using a limited amount of an impact-resistant resin composition, a method of producing the molded body, and a method of recycling the molded body, and to further provide a recycling method in which a limited amount of the impact-resistant resin composition is used and by which a polyolefin-based recycled resin composition can be effectively utilized.

That is, the present invention includes the following aspects.

[1] A molded body including a design layer, an intermediate layer, and a back layer laminated in this order, the design layer and the back layer each being a non-foamed layer, and the intermediate layer being a foamed layer, in which the design layer, the intermediate layer, and the back layer are respectively formed of a first resin composition, a second resin composition, and a third resin composition each containing a polyolefin as a main component, and the first resin composition is an impact-resistant resin composition including a polyolefin, a polyamide, and a polyolefin-based modified elastomer having a reactive group reactive with the polyamide.

[2] The molded body according to [1], in which the intermediate layer is a core-back foamed layer formed by core-back foaming of the second resin composition between the design layer and the back layer.

[3] The molded body according to [1] or [2], in which the second resin composition is a polyolefin-based recycled resin composition.

[4] The molded body according to any one of [1] to [3], in which the third resin composition is an impact-resistant resin composition including a polyolefin, a polyamide, and a polyolefin-based modified elastomer having a reactive group reactive with the polyamide.

[5] A method of producing the molded body described in any one of [1] to [4], the method including disposing a first support layer to serve as the design layer and a third support layer to serve as the back layer in a state where the first support layer and the third support layer are spaced apart from each other and face each other, interposing the second resin composition provided with foamability in a gap between the first support layer and the third support layer, and forming the intermediate layer by expanding the gap while causing the second resin composition to foam.

[6] A method of recycling a polyolefin-based resin composition, the method including disposing a first support layer and a third support layer in a state where the first support layer and the third support layer are spaced apart from each other and face each other, the first support layer being formed of a first resin composition including a polyolefin, a polyamide, and a polyolefin-based modified elastomer having a reactive group reactive with the polyamide, the third support layer being formed of a third resin composition containing a polyolefin as a main component, interposing a polyolefin-based recycled resin composition provided with foamability in a gap between the first support layer and the third support layer, and forming an intermediate layer by expanding the gap while causing the polyolefin-based recycled resin composition to foam, and thereby producing a molded body including a design layer, the intermediate layer, and a back layer laminated in this order, the design layer being a non-foamed layer formed by the first support layer, the intermediate layer being a foamed layer, and the back layer being a non-foamed layer formed by the third support layer.

[7] A method of recycling the molded body described in any one of [1] to [4], the method including segmentalizing the molded body to obtain a polyolefin-based recycled resin.

The molded body according to an embodiment of the present invention can be mass-produced using a limited amount of an impact-resistant resin composition.

According to the method of producing a molded body of an embodiment of the present invention, a molded body can be mass-produced using a limited amount of the impact-resistant resin composition.

According to the method of recycling a molded body of an embodiment of the present invention, the molded body of an embodiment of the present invention can be effectively utilized as a polyolefin-based recycled resin.

According to the recycling method in which the molded body of an embodiment of the present invention is used, the molded body of an embodiment of the present invention can be effectively utilized as a polyolefin-based recycled resin.

According to the recycling method of an embodiment of the present invention in which a polyolefin-based recycled resin composition is used, a molded body can be mass-produced using a limited amount of the impact-resistant resin composition and using the polyolefin-based recycled resin composition.

BRIEF DESCRIPTION OF THE DRAWINGS

The present invention will be further described in the following detailed description with reference to the following figures, given non-limiting examples of exemplary embodiments according to the invention, and like reference symbols represent identical parts through several figures.

DETAILED DESCRIPTION OF PREFERRED EMBODIMENTS

Figure 1:
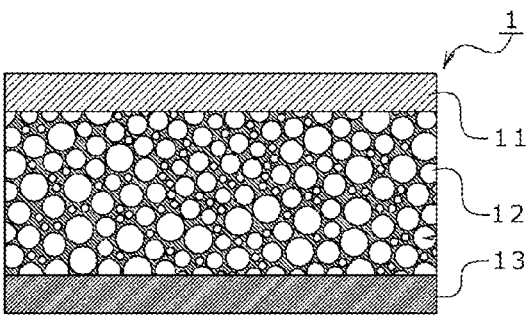
FIG. 1 is an explanatory view illustrating an example of a molded body.

Subjects shown herein are illustrative one and one for describing embodiments of the invention exemplarily, and are described for providing one believed to be explanation in which the principles and conceptual characteristics of the invention can be understood most effectively and without any difficulty. In this regard, no attempt is made to show structural details of the invention in more detail than is necessary for the fundamental understanding of the invention, and the description is taken with the drawings making apparent to those skilled in the art how several forms of the invention may be embodied in practice.

[1] Molded Body

A molded body 1 according to an embodiment of the present invention is a molded body 1 including a design layer 11 being a non-foamed layer, an intermediate layer 12 being a foamed layer, and a back layer 13 being a non-foamed layer, which are laminated in this order, and the molded body 1 is characterized in that the design layer 11, the intermediate layer 12, and the back layer 13 are respectively formed of a first resin composition, a second resin composition, and a third resin composition each containing a polyolefin as a main component, and the first resin composition is an impact-resistant resin composition including a polyolefin, a polyamide, and a polyolefin-based modified elastomer having a reactive group reactive with the polyamide.

At present, it is difficult to mass-produce a recycled impact-resistant resin composition consisting only of an impact-resistant resin composition. This is because the production amounts and the distribution amounts of the impact-resistant resin compositions are limited, as described above. Therefore, in the present invention, the impact-resistant resin composition is typically a newly produced resin composition.

The impact-resistant resin composition contains a polyolefin as a main component (includes a polyolefin in an amount of 50 mass % or more based on the total mass of the resin composition). Thus, the impact-resistant resin composition has excellent affinity for another resin composition containing a polyolefin as a main component (including a polyolefin in an amount of 50 mass % or more based on the total mass of the resin composition).

On the other hand, a polyolefin-based recycled resin composition is a recycled resin composition containing a polyolefin as a main component (including a polyolefin in an amount of 50 mass % or more based on the total mass of the resin composition). For example, the polyolefin-based recycled resin composition is produced by using, as a raw material, a molded body or the like formed of a resin composition containing a polyolefin as a main component. The polyolefin-based recycled resin composition, because being a recycled resin composition, is typically colored. That is, at present, it is not possible to remove the color of such a colored polyolefin resin composition to obtain a colorless or white resin composition. Accordingly, it is difficult to utilize a recycled resin composition for a design layer of which ornamental characteristics are regarded as important, because the recycled resin composition is colored.

Therefore, when the impact-resistant resin composition is utilized as the design layer 11 which is a non-foamed layer, and the resin composition containing a polyolefin as a main component, such as a polyolefin-based recycled resin composition, is utilized as the intermediate layer 12 and the back layer 13, the molded body can be mass-produced using a limited amount of the impact-resistant resin composition. The molded body obtained in this case has excellent impact resistance and ornamental characteristics because of the presence of the non-foamed design layer 11. In addition, the molded body can have a required thickness, can be light-weight, and can be produced in a material saving manner, because of the use of the foamed intermediate layer. Furthermore, the molded body has excellent rigidity as a whole, because the molded body has a structure in which the foamed intermediate layer 12 is sandwiched between the non-foamed design layer 11 and back layer 13.

Moreover, strong bonding among the design layer 11, the intermediate layer 12, and the back layer 13 can be achieved, because the first resin composition (the impact-resistant resin) forming the design layer 11, the resin composition forming the intermediate layer 12 (the second resin composition), and the resin composition forming the back layer 13 (the third resin composition) are all resin compositions containing a polyolefin as a main component. That is, these layers can be firmly bonded to each other without separately utilizing an adhesive or the like.

Specifically, the design layer 11, the intermediate layer 12, and the back layer 13 can be integrated by causing core-back foaming of the second resin composition (the polyolefin-based recycled resin composition) between the design layer 11 and the back layer 13 to form the intermediate layer 12, which is a core-back foamed layer, between the design layer 11 and the back layer 13. In this case, it is not necessary to produce each layer separately and then bond the layers together. That is, it is possible to eliminate a bonding step. In addition, an adhesive for the bonding may not be required. Therefore, it is possible to reduce the number of processing steps required for producing a molded body, and achieve the object of providing a mono-material molded body at a higher degree.

Furthermore, as the third resin composition forming the back layer 13, various compositions can be utilized as necessary. For example, when more excellent mechanical strength is required for the molded body 1, an impact-resistant resin composition can be utilized as the third resin composition. In another case, from the viewpoint of increasing the usage amount of the polyolefin-based recycled resin composition, a polyolefin-based recycled resin can be utilized as the third resin composition. When an impact-resistant resin composition is utilized as the third resin composition, the impact-resistant resin composition used as the third resin composition may be the same as or different from the impact-resistant resin composition used as the first resin composition.

The molded body according to an embodiment of the present invention will be described in more detail below.

(1) Molded Body

Figure 2:
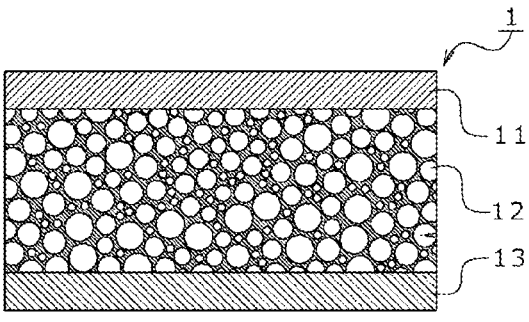
FIG. 2 is an explanatory view illustrating another example of the molded body.
Figure 3:
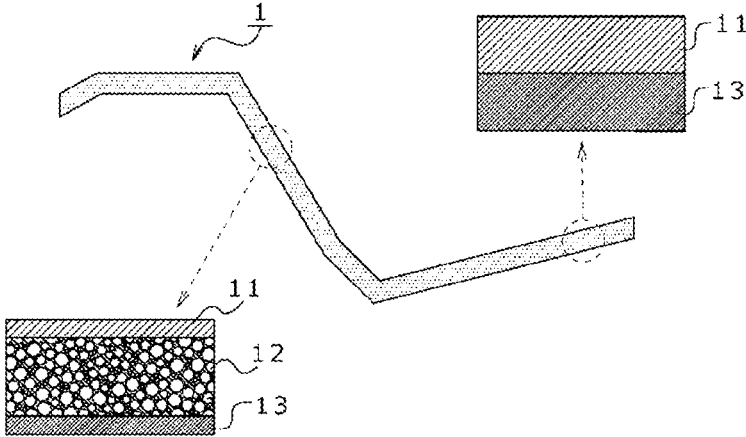
FIG. 3 is an explanatory view illustrating a variation of the molded body.

The "molded body 1" includes the design layer 11, the intermediate layer 12, and the back layer 13 which are laminated in this order (see FIGS. 1 to 3). The molded body may or may not include another layer in addition to these three layers. When no other layer is provided, the molded body 1 includes only the three layers mentioned above.

The thickness of each layer included in the molded body 1 is not particularly limited. However, when the thickness of the design layer 11 is defined as $D_{11}$, the thickness of the intermediate layer 12 is defined as $D_{12}$, and the thickness of the back layer 13 is defined as $D_{13}$, these thicknesses can satisfy the relation $D_{11} \leq D_{12}$, and preferably satisfy the relation $D_{11} < D_{12}$. In addition, these thicknesses can satisfy the relation $D_{13} \leq D_{12}$, and preferably satisfy the relation $D_{13} < D_{12}$. Furthermore, these thicknesses can satisfy the relation $(D_{11}+D_{13}) \leq D_{12}$. It is noted that the relation between the thicknesses $D_{11}$ and $D_{13}$ is not particularly limited.

To be more specific, for example, $D_{11}$ can be from 0.1 to 0.9 mm. $D_{12}$ can be from 1.0 to 3.0 mm. Furthermore, $D_{13}$ can be from 0.1 to 0.9 mm. A thickness D of the entire molded body 1 is not particularly limited and D can be from 1.2 to 4.8 mm, from 2.0 to 4.0 mm, or from 2.5 to 3.5 mm, for example.

The shape of the molded body is also not particularly limited and can be appropriately selected depending on the purpose, application, and the like. For example, the molded body can be a plate-shaped body (a board), a sheet-shaped body, a cylindrical body, a semi-cylindrical body, a rod-shaped body, a linear body, a lump-shaped body, or the like. Furthermore, the molded body may be a shaped body shaped in an shape described above. An example of such a shaped body is a shaped body obtained by forming, in a plate-shaped body, a recess and/or protrusion, or the like in a plate thickness direction. Examples of such a molded body include interior materials for vehicles described below. The application and the like of the molded body will be described in more detail below.

The molded body 1 may include the intermediate layer 12 across the whole extent of the molded body 1. However, the molded body 1 may have both a portion including the intermediate layer 12 and a portion not including the intermediate layer 12, as illustrated in FIG. 3, for example.

(2) Design Layer

The "design layer 11" is a non-foamed layer and is formed of the first resin composition. The first resin composition contains polyolefins as a main component. This means that the first resin composition includes 50 mass % or more of the polyolefins, based on the total mass (100 mass %) of the first resin composition.

The polyolefins in this context include the polyolefin-based modified elastomer described below and another polyolefin other than the polyolefin-based modified elastomer. In other words, the polyolefins in this context may or may not include a reactive group capable of reacting with the polyamide. Furthermore, the polyolefins in this context may or may not be an elastomer.

The polyolefins (polyolefins including the polyolefin-based modified elastomer) are an olefin homopolymer and/or an olefin copolymer. Examples of olefins forming the polyolefin include, but are not limited to, ethylene, propylene, 1-butene, 3-methyl-1-butene, 1-pentene, 3-methyl-1-pentene, 4-methyl-1-pentene, 1-hexene, and 1-octene. Only one type of these olefins may be used or two or more types thereof may be used in combination.

Accordingly, examples of the polyolefin include a polyethylene, a polypropylene, poly-1-butene, poly-1-hexene, and poly-4-methyl-1-pentene. Only one type of these polymers may be used or two or more types thereof may be used in combination. That is, the polyolefin may be a mixture of the polymers mentioned above.

Among the polymers mentioned above, examples of the polyethylene include an ethylene homopolymer and a copolymer of ethylene and another olefin. Examples of the copolymer of ethylene and another olefin include an ethylene-1-butene copolymer, an ethylene-1-hexene copolymer, an ethylene-1-octene copolymer, and an ethylene-4-methyl-1-pentene copolymer. It is noted that 50% or more of the total number of structural units in the copolymer of ethylene and another olefin are ethylene-derived units.

Among the polymers mentioned above, examples of the polypropylene include a propylene homopolymer and a copolymer of propylene and another olefin. Examples of another olefin include the above-mentioned various types of olefins (except for propylene). Among these olefins, ethylene and 1-butene are preferred. That is, the copolymer of propylene and another olefin is preferably a propylene-ethylene copolymer or a propylene-1-butene copolymer.

Furthermore, the copolymer of propylene and another olefin may be a random copolymer or a block copolymer. A block copolymer is preferred because of excellent impact resistance. Particularly, a propylene-ethylene block copolymer having ethylene as another olefin is preferred. The propylene-ethylene block copolymer is a block copolymerized polypropylene having an ethylene block as a dispersed phase. More specifically, the propylene-ethylene block copolymer is a polypropylene resin containing a continuous phase composed of homopolypropylene, and a dispersed phase including polyethylene present in the continuous phase. Such a block copolymerized polypropylene containing an ethylene block as a dispersed phase is also referred to as, for example, an impact copolymer, a polypropylene impact copolymer, a heterophasic polypropylene, or a heterophasic block polypropylene. Such a block copolymerized polypropylene is preferred because of excellent impact resistance.

It is noted that 50% or more of the total number of structural units in the copolymer of propylene and another olefin are propylene-derived units.

The first resin composition includes a polyolefin (a polyolefin not including the polyolefin-based modified elastomer), a polyamide, and a polyolefin-based modified elastomer having a reactive group reactive with the polyamide.

The polyolefin included in the first resin composition is a polymer having a main chain (polyolefin skeleton) derived from an olefin. The polyolefin in this context excludes the polyolefin-based modified elastomer described below, and is different from the polyolefin-based modified elastomer in that the polyolefin does not have a reactive group capable of reacting with the polyamide.

The polyolefin included in the first resin composition is different from the polyolefin serving as the main component described above only in that the polyolefin included in the first resin composition does not include a polyolefin having a reactive group capable of reacting with the polyamide, but in other respects, is the same as the polyolefin serving as the main component described above. That is, the above description of the polyolefin serving as the main component can be applied to the polyolefin in this context. The first resin composition may include only one type of polyolefin or may include two or more types of polyolefins.

The weight-average molecular weight (calibrated based on polystyrene standards) of the polyolefin included in the first resin composition measured by using gel permeation chromatography (GPC) is not particularly limited, and may be, for example, from 10000 to 700000, preferably from 100000 to 650000, and more preferably from 200000 to 600000.

The weight-average molecular weight (calibrated based on polystyrene standards) can be changed within the above ranges according to the type of the polyamide described below. For example, when the polyamide included in the first resin composition is polyamide 6 (PA6), polyamide 66 (PA66), polyamide 610 (PA610), polyamide 612 (PA612), polyamide 614 (PA614), polyamide 6T (PA6T), polyamide 6I (PA6I), polyamide M5T (PAM5T), polyamide MXD6 (PAMXD6), polyamide 6T/66 (PA6T/66), polyamide 6T/6I (PA6T/6I), polyamide 6T/6I/66 (PA6T/6I/66), polyamide 6T/2M-5T (PA6T/2M-5T), or the like, the weight-average molecular weight of the polyolefin included in the first resin composition can be from 35000 to 700000, from 450000 to 650000, or from 510000 to 600000.

For example, when the polyamide included in the first resin composition is polyamide 11 (PA11), polyamide 12 (PA12), polyamide 610 (PA610), polyamide 612 (PA612), polyamide 614 (PA614), polyamide 9T (PAST), polyamide 1010 (PA1010), polyamide 1012 (PA1012), polyamide 10T (PA10T), polyamide 9T/2M-8T (PA9T/2M-8T), or the like, the weight-average molecular weight of the polyolefin included in the first resin composition can be from 10000 to 450000, from 100000 to 400000, or from 200000 to 400000.

The melt flow rate (MFR) of the polyolefin included in the first resin composition is not particularly limited, and can be, for example, from 1 to 1000 g/10 min, preferably from 2 to 500 g/10 min, and more preferably from 3 to 250 g/10 min. It is noted that the MFR of the polyolefin is measured under the conditions of a temperature of 230° C. and a load of 21.18 N (2.16 kgf) in accordance with JIS K 7210.

The MFR can be changed within the above ranges according to the type of the polyamide described below. For example, when the polyamide included in the first resin composition is polyamide 6 (PA6), polyamide 66 (PA66), polyamide 610 (PA610), polyamide 612 (PA612), polyamide 614 (PA614), polyamide 6T (PA6T), polyamide 6I (PA6I), polyamide M5T (PAMST), polyamide MXD6 (PAMXD6), polyamide 6T/66 (PA6T/66), polyamide 6T/6I (PA6T/6I), polyamide 6T/6I/66 (PA6T/6I/66), polyamide 6T/2M-5T (PA6T/2M-5T), or the like, the MFR of the polyolefin included in the first resin composition can be from 1 to 25 g/10 min, from 2 to 16 g/10 min, or from 3 to 8 g/10 min.

In addition, for example, when the polyamide included in the first resin composition is polyamide 11 (PA11), polyamide 12 (PA12), polyamide 610 (PA610), polyamide 612 (PA612), polyamide 614 (PA614), polyamide 9T (PA9T), polyamide 1010 (PA1010), polyamide 1012 (PA1012), polyamide 10T (PA10T), polyamide 9T/2M-8T (PA9T/2M-8T), or the like, the MFR of the polyolefin included in the first resin composition can be from 10 to 1000 g/10 min, from 13 to 500 g/10 min, or from 17 to 250 g/10 min.

The polyamide included in the first resin composition is a polymer having a chain skeleton formed by polymerization of a plurality of monomers via amide bonds (—NH— CO—). The first resin composition may include only one type of polyamide or may include two or more types of polyamides.

Examples of the monomer forming the polyamide include amino acids such as 6-aminocaproic acid, 11-aminoundecanoic acid, 12-aminododecanoic acid, and p-aminomethylbenzoic acid; and lactams such as ε-caprolactam, undecane lactam, and ω-lauryl lactam. Only one type of these monomers may be used or two or more types thereof may be used in combination.

Furthermore, the polyamide can be obtained by copolymerization of a diamine and a dicarboxylic acid. In this case, examples of the diamine as a monomer include: aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexanediamine and bis-(4-aminocyclohexyl)methane; and aromatic diamines such as xylylenediamines (e.g., p-phenylenediamine and m-phenylenediamine). Only one type of these diamines may be used or two or more types thereof may be used in combination.

Examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acids; and aromatic dicarboxylic acids such as phthalic acid, terephthalic acid, isophthalic acid, and naphthalene dicarboxylic acid. Only one type of these dicarboxylic acids may be used or two or more types thereof may be used in combination.

That is, examples of the polyamides include polyamide 6 (PA6), polyamide 66 (PA66), polyamide 11 (PA11), polyamide 610 (PA610), polyamide 612 (PA612), polyamide 614 (PA614), polyamide 12 (PA12), polyamide 6T (PA6T), polyamide 6I (PA6I), polyamide 9T (PA9T), polyamide M5T (PAM5T), polyamide 1010 (PA1010), polyamide 1012 (PA1012), polyamide 10T (PA10T), polyamide MXD6 (PAMXD6), polyamide 6T/66 (PA6T/66), polyamide 6T/6I (PA6T/6I), polyamide 6T/6I/66 (PA6T/6I/66), polyamide 6T/2M-5T (PA6T/2M-5T), and polyamide 9T/2M-8T (PA9T/2M-8T). Only one type of these polyamides may be used or two or more types thereof may be used in combination.

Among the various types of polyamides described above, a plant-derived polyamide produced using a monomer obtained from a component derived from a plant, such as a vegetable oil, can be suitably used from the viewpoint of carbon neutrality and environmental protection. Examples of the plant-derived polyamide include polyamide 11 (PA11), polyamide 610 (PA610), polyamide 612 (PA612), polyamide 614 (PA614), polyamide 1010 (PA1010), polyamide 1012 (PA1012), and polyamide 10T (PA10T). Only one type of these plant-derived polyamides may be used or two or more types thereof may be used in combination.

Among the various types of polyamides described above, polyamide 6 and polyamide 66 can be suitably used from the viewpoint of versatility and cost performance.

The polyolefin-based modified elastomer included in the first resin composition is an elastomer having a reactive group reactive with the polyamide described above. That is, the polyolefin-based modified elastomer has a main chain (polyolefin skeleton) derived from an olefin and further has a reactive group reactive with the polyamide. Therefore, although the polyolefin-based modified elastomer is a type of polyolefin, the polyolefin-based modified elastomer can exhibit affinity for both of the polyolefin component and the polyamide component and can function as a compatibilizer for both components. The first resin composition may include only one type of polyolefin-based modified elastomer or may include two or more types of polyolefin-based modified elastomers.

The elongation at break (elongation percentage at break) of the polyolefin-based modified elastomer is not particularly limited, but the tensile strain at break (in accordance with ASTM D638) is typically 400% or more, and for example, can be 700% or more.

Examples of the reactive group reactive with the polyamide include an acid anhydride group (—CO—O—OC—), a carboxyl group (—COOH), an epoxy group {—C₂O (a three-membered ring structure including two carbon atoms and one oxygen atom)}, an oxazoline group (—C₃H₄NO), and an isocyanate group (—NCO). Only one type of these reactive groups may be used or two or more types thereof may be used in combination.

The amount of modification is not particularly limited, as long as the polyolefin-based modified elastomer has one or more reactive groups per molecule. However, the polyolefin-based modified elastomer preferably has from 1 to 50 reactive groups per molecule, more preferably from 3 to 30 reactive groups per molecule, and particularly preferably from 5 to 20 reactive groups per molecule.

Examples of a monomer into which the reactive group can be introduced include: a monomer having a polymerizable unsaturated bond and an acid anhydride group; a monomer having a polymerizable unsaturated bond and a carboxyl group; and a monomer having a polymerizable unsaturated bond and an epoxy group.

Specific examples thereof include: acid anhydrides such as maleic anhydride, itaconic anhydride, succinic anhydride, glutaric anhydride, adipic anhydride, citraconic anhydride, tetrahydrophthalic anhydride, and butenyl succinic anhydride; and carboxylic acids such as maleic acid, itaconic acid, fumaric acid, acrylic acid, and methacrylic acid. Only one type of these monomers may be used or two or more types thereof may be used in combination. Among these compounds, acid anhydrides are preferred, maleic anhydride and itaconic anhydride are more preferred, and maleic anhydride is particularly preferred.

The polyolefin skeleton of the polyolefin-based modified elastomer may be a homopolymer of an olefin, but as mentioned above, from the viewpoint of obtaining the properties of an elastomer, the polyolefin skeleton is typically a copolymer of olefins (a copolymer of two or more different olefin monomers). The type of the olefin that forms the polyolefin skeleton of the polyolefin-based modified elastomer is not particularly limited, and examples of the olefin include ethylene, propylene, and a α-olefin having from 4 to 8 carbons. Examples of the α-olefin having from 4 to 8 carbons include 1-butene, 3-methyl-1-butene, 1-pentene, 3-methyl-1-pentene, 4-methyl-1-pentene, 1-hexene, and 1-octene. Among these, a copolymer of ethylene and an α-olefin having from 3 to 8 carbons and a copolymer of propylene and an α-olefin having from 4 to 8 carbons are preferred. By utilizing a polyolefin-based modified elastomer having such a polyolefin skeleton, it is possible to provide a first resin composition (and thus the design layer 11) having better impact resistance.

Examples of the above-described copolymer of ethylene and an α-olefin having from 3 to 8 carbons include an ethylene-propylene copolymer (EPR), an ethylene-1-butene copolymer (EBR), an ethylene-1-pentene copolymer, and an ethylene-1-octene copolymer (EOR). Examples of the copolymer of propylene and an α-olefin having from 4 to 8 carbons include a propylene-1-butene copolymer (PBR), a propylene-1-pentene copolymer, and a propylene-1-octene copolymer (POR). Only one type of these copolymers may be used or two or more types thereof may be used in combination.

The weight-average molecular weight (calibrated based on polystyrene standards) of the polyolefin-based modified elastomer included in the first resin composition measured by using gel permeation chromatography (GPC) is not particularly limited, and can be, for example, from 10000 to 500000, preferably from 35000 to 500000, and more preferably from 35000 to 300000.

The proportions of the polyolefin, the polyamide, and the polyolefin-based modified elastomer in the first resin composition are not particularly limited, but can be, for example, as follows.

Based on the total mass (100 mass %) of the polyolefin, the polyamide, and the polyolefin-based modified elastomer included in the first resin composition, the proportion of the polyolefin may be from 2 to 99.5 mass %, preferably from 5 to 99 mass %, more preferably from 10 to 98 mass %, even more preferably from 20 to 97 mass %, still more preferably from 25 to 96 mass %, and still even more preferably from 35 to 95 mass %.

In particular, when the first resin composition is used as a composition having a higher proportion of polyolefin, the proportion of the polyolefin can be from 65 to 99.5 mass %, preferably from 68 to 99 mass %, more preferably from 72 to 98 mass %, even more preferably from 75 to 97 mass %, still more preferably from 82 to 96 mass %, and still even more preferably from 85 to 95 mass %.

Based on the total mass (100 mass %) of the polyolefin, the polyamide, and the polyolefin-based modified elastomer included in the first resin composition, the proportion of the polyamide and the polyolefin-based modified elastomer (a part or all of which may be reacted with each other) can be from 0.5 to 98 mass %, preferably from 1 to 95 mass %, more preferably from 2 to 90 mass %, even more preferably from 3 to 80 mass %, still more preferably from 4 to 75 mass %, and still even more preferably from 5 to 65 mass %.

In particular, when the first resin composition is used as a composition having a higher proportion of polyolefin, the proportion of the polyamide and the polyolefin-based modified elastomer can be from 0.5 to 35 mass %, preferably from 1 to 32 mass %, more preferably from 2 to 28 mass %, even more preferably from 3 to 25 mass %, still more preferably from 4 to 18 mass %, and still even more preferably from 5 to 15 mass %.

Based on the total mass (100 mass %) of the polyolefin, the polyamide, and the polyolefin-based modified elastomer included in the first resin composition, the proportion of the polyamide can be from 0.05 to 75 mass %, preferably from 0.1 to 70 mass %, more preferably from 0.5 to 65 mass %, even more preferably from 1 to 60 mass %, still more preferably from 2 to 50 mass %, and still even more preferably from 3 to 40 mass %.

In particular, when the first resin composition is used as a composition having a higher proportion of polyolefin, the proportion of the polyamide can be from 0.05 to 28 mass %, preferably from 0.1 to 22 mass %, more preferably from 0.5 to 16 mass %, even more preferably from 1 to 12 mass %, still more preferably from 2 to 10 mass %, and still even more preferably from 3 to 8 mass %.

Based on the total mass (100 mass %) of the polyolefin, the polyamide, and the polyolefin-based modified elastomer included in the first resin composition, the proportion of the polyolefin-based modified elastomer can be from 0.05 to 60 mass %, preferably from 0.1 to 55 mass %, more preferably from 0.5 to 45 mass %, even more preferably from 1 to 40 mass %, still more preferably from 1.5 to 38 mass %, and still even more preferably from 2 to 35 mass %.

In particular, when the first resin composition is used as a composition having a higher proportion of polyolefin, the proportion of the polyolefin-based modified elastomer can be from 0.05 to 26 mass %, preferably from 0.1 to 20 mass %, more preferably from 0.5 to 14 mass %, even more preferably from 1 to 11 mass %, still more preferably from 1.5 to 9 mass %, and still even more preferably from 2 to 7 mass %.

The phase structure of the first resin composition is not particularly limited, but the first resin composition can have the following phase structures (1) to (3).

Phase structure (1): A phase structure having a continuous phase (A) including the polyolefin and a dispersed phase (B) dispersed in the continuous phase (A) and including the polyamide and the polyolefin-based modified elastomer. It is noted that the phase structure (1) does not coexist with another phase structure having a continuous phase including the polyamide and a dispersed phase dispersed in the continuous phase.

Phase structure (2): A phase structure having a continuous phase (A) including the polyamide and a dispersed phase (B) dispersed in the continuous phase (A) and including the polyolefin. It is noted that the phase structure (2) does not coexist with another phase structure having a continuous phase including the polyolefin and a dispersed phase dispersed in the continuous phase.

Phase structure (3): A phase structure having a continuous phase $(A_1)$ including the polyolefin, a dispersed phase $(B_{41})$ dispersed in the continuous phase $(A_1)$ and including the polyamide and the polyolefin-based modified elastomer, a continuous phase $(A_2)$ including a polyamide resin, and a dispersed phase $(B_{42})$ dispersed in the continuous phase $(A_2)$ and including the polyolefin-based modified elastomer. That is, the phase structure (3) can be a co-continuous phase structure in which the continuous phase $(A_1)$ and the continuous phase $(A_2)$ coexist.

In the phase structure (1), the dispersed phase (B) may further have a continuous phase $(B_1)$ that is present in the dispersed phase (B) and includes the polyamide and a fine dispersed phase $(B_2)$ that is dispersed in the continuous phase $(B_1)$ and includes the polyolefin-based modified elastomer. In this case, the phase structure (1) has a multiphase structure having a fine dispersed phase $(B_1)$ further dispersed in the dispersed phase (B). It is noted that the polyolefin-based modified elastomer in the phase structure (1) may be an unreacted elastomer, a product obtained by reaction with the polyamide, or a mixture of these.

In the phase structure (3), the dispersed phase $(B_{41})$ in the continuous phase $(A_1)$ can have a continuous phase $(B_{411})$ that is present in the dispersed phase $(B_{41})$ and includes the polyamide and a fine dispersed phase $(B_{412})$ that is dispersed in the continuous phase $(B_{411})$ and includes the polyolefin-based modified elastomer. In this case, the phase structure (3) is a multiphase structure having a fine dispersed phase $(B_{412})$ further dispersed in the dispersed phase $(B_{41})$. It is noted that the polyolefin-based modified elastomer in the phase structure (3) may be an unreacted elastomer, a product obtained by reaction with the polyamide, or a mixture of these.

It is noted that the first resin composition can include a reaction product of the reaction of the reactive group of the polyolefin-based modified elastomer with the polyamide resin. In this case, in the phase structure (1), the reaction product can be present at, for example, the interface between the continuous phase (A) and the dispersed phase (B) and/or the interface between the continuous phase $(B_1)$ and the fine dispersed phase $(B_2)$. Similarly, in the phase structure (3), the reaction product can be present at, for example, the interface between the continuous phase $(A_1)$ and the continuous phase $(A_2)$, the interface between the continuous phase $(A_1)$ and the dispersed phase $(B_{41})$, and the interface between the continuous phase $(B_{411})$ and the fine dispersed phase $(B_{412})$.

The various types of phase structures can be observed by using a field-emission scanning electron microscope (FE-SEM) to observe a treated surface of a test specimen subjected to oxygen plasma etching and then to osmium coating. In particular, the dispersed phase and the fine dispersed phase can be observed in an image enlarged 1000 times or more (and typically 10000 times or less) by such a method. The components included in each phase can be identified by analysis using energy dispersive X-ray spectroscopy (EDS) performed during the observation using a field-emission scanning electron microscope (FE-SEM).

The size of the dispersed phase of the first resin composition is not particularly limited, but the dispersion diameter (average dispersion diameter) of the dispersed phase is preferably 10000 nm or less, more preferably from 50 to 8000 nm, and even more preferably from 100 to 4000 nm.

The dispersion diameter of the dispersed phase can be measured in an electron microscope image enlarged 1000 times or more. More specifically, 20 particles of the dispersed phase are randomly selected in a predetermined area in the image, the largest diameter of each of the particles is measured to determine a first average value, which is an average value of the measured largest diameters. Then, first average values measured in 5 different areas in the image are further averaged to determine an average dispersion diameter (major-axis average dispersion diameter) of the dispersed phase.

The size of the fine dispersed phase (the fine dispersed phase $B_2$, the fine dispersed phase $B_{412}$, or the like) included in the dispersed phase (the dispersed phase B, the dispersed phase Bpd, or the like) of the first resin composition is not particularly limited, but the dispersion diameter (average dispersion diameter) of the fine dispersed phase is preferably from 5 to 1000 nm, more preferably from 5 to 600 nm, even more preferably from 10 to 400 nm, and particularly preferably from 15 to 350 nm.

The dispersion diameter of the fine dispersed phase can be measured in an electron microscope image enlarged 1000 times or more. More specifically, 20 particles of the fine dispersed phase are randomly selected in a predetermined area in the image, the largest diameter of each of the particles is measured to determine a first average value, which is an average value of the measured largest diameters. Then, first average values measured in 5 different areas in the image are further averaged to determine an average dispersion diameter (major-axis average dispersion diameter) of the fine dispersed phase.

It is noted that the above-described proportion of the polyolefin based on the total mass (100 mass %) of the polyolefin, the polyamide, and the polyolefin-based modified elastomer is equal to the proportion of the continuous phase (A) based on the total mass (100 mass %) of the phases in the phase structure (1), and is equal to the proportion of the continuous phase ($A_1$) based on the total mass (100 mass %) of the phases in the phase structure (3). Although the proportion in this context is a proportion of volume, the proportion is substantially equal to a proportion of area (the same applies hereinafter).

Furthermore, the above-described proportion of the polyamide and the polyolefin-based modified elastomer based on the total mass (100 mass %) of the polyolefin, the polyamide, and the polyolefin-based modified elastomer is equal to the proportion of the dispersed phase (B) based on the total mass (100 mass %) of the phases in the phase structure (1), and is equal to the combined proportion of the dispersed phase ($B_{41}$), the continuous phase ($A_2$), and the dispersed phase ($B_{42}$) based on the total mass (100 mass %) of the phases in the phase structure (3).

Moreover, the above-described proportion of the polyamide resin based on the total mass (100 mass %) of the polyolefin, the polyamide, and the polyolefin-based modified elastomer is equal to the proportion of the continuous phase ($B_1$) based on the total mass (100 mass %) of the phases in the phase structure (1), and is equal to the combined proportion of the continuous phase ($A_2$) and the continuous phase ($B_{411}$) in the dispersed phase based on the total mass (100 mass %) of the phases in the phase structure (3).

Furthermore, the above-described proportion of the polyolefin-based modified elastomer based on the total mass (100 mass %) of the polyolefin, the polyamide, and the polyolefin-based modified elastomer is equal to the proportion of the fine dispersed phase ($B_2$) based on the total mass (100 mass %) of the phases in the phase structure (1), and is equal to the combined proportion of the fine dispersed phase ($B_{412}$) and the dispersed phase ($B_{42}$) based on the total mass (100 mass %) of the phases in the phase structure (3).

The first resin composition can contain another component in addition to the polyolefin, the polyamide, and the polyolefin-based modified elastomer.

Examples of the other component include an antioxidant, a heat stabilizer, a weathering agent, a light stabilizer, a plasticizer, an ultraviolet absorber, an antistatic agent, a flame retardant, an auxiliary flame retardant, a slip agent, an anti-blocking agent, an anti-fogging agent, a lubricant, an antimicrobial agent, a filler (reinforcing filler), a colorant, a dispersant, a copper damage inhibitor, a neutralizer, an anti-foaming agent, a weld strength improver, a natural oil, a synthetic oil, and a wax. Only one type of these components may be used or two or more types thereof may be used in combination.

The first resin composition can be a composition without a filler among the other components described above. Examples of the filler include: glass components (e.g., glass fibers, glass beads, glass flakes); silica; inorganic fibers (glass fibers, alumina fibers, carbon fibers); graphite; silicate compounds (e.g., calcium silicate, aluminum silicate, montmorillonite, kaolin, talc, clay); metal oxides (e.g., iron oxide, titanium oxide, zinc oxide, antimony oxide, alumina); carbonates and sulfates of metals such as lithium, calcium, magnesium, and zinc; metals (e.g., aluminum, iron, silver, copper); hydroxides (e.g., aluminum hydroxide, magnesium hydroxide); sulfides (e.g., barium sulfate); carbonized products (e.g., charcoal, bamboo charcoal); titanides (e.g., potassium titanate, barium titanate); organic fibers (e.g., aromatic polyester fibers, aromatic polyamide fibers, fluororesin fibers, polyimide fibers, vegetable fibers); and celluloses (e.g., cellulose microfibrils, cellulose acetate). Only one type of these fillers may be used or two or more types thereof may be used in combination.

(3) Intermediate Layer

The "intermediate layer 12" is a foamed layer and is formed of the second resin composition. The second resin composition contains a polyolefin as a main component. This means that the second resin composition includes 50 mass % or more of the polyolefin, based on the total mass (100 mass %) of the second resin composition.

The second resin composition may be a fresh polyolefin (virgin material), but is preferably a polyolefin-based recycled resin composition or a mixture of a fresh polyolefin and a polyolefin-based recycled resin composition. The polyolefin-based recycled resin composition may be a mixture of various polyolefins.

That is, as long as the polyolefin which is the main component of the second resin composition has a polyolefin skeleton, the polyolefin may include any other structure without limitation. Therefore, the polyolefin which is the main component of the second resin composition may include the polyolefin included in the first resin composition, the polyolefin-based modified elastomer included in the first resin composition, and the like.

When the second resin composition is a polyolefin-based recycled resin composition, the second resin composition can contain another thermoplastic resin and/or another thermoplastic elastomer which are not polyolefins (that is, a thermoplastic resin and/or a thermoplastic elastomer not having a polyolefin skeleton). Examples of the other thermoplastic resin and thermoplastic elastomer include polyester, polystyrene, polyurethane, polyethylene terephthalate, polyamide, polycarbonate, acrylic resin, methacrylic resin, polyacrylate, polymethacrylate, polyacetal, and ABS. Only one type of these other thermoplastic resins and thermoplastic elastomers may be used or two or more types thereof may be used in combination. These other thermoplastic resins and thermoplastic elastomers can have a reactive group. Specific examples of the reactive group include a carboxy group, an acid anhydride group (maleic anhydride, phthalic anhydride group, succinic anhydride group, and the like), a hydroxy group, an isocyanate group, an amino group, a halogen group, and the like. Only one type of these reactive groups may be used or two or more types thereof may be used in combination.

When the second resin composition is a polyolefin-based recycled resin composition, based on the total mass (100 mass %) of the second resin composition, the second resin composition preferably includes 50 mass % or more (and up to 100 mass %) of the polyolefin, and can include from 55 to 99 mass %, from 60 to 98 mass %, from 65 to 97 mass %, from 70 to 96 mass %, or from 80 to 95 mass % of the polyolefin.

Furthermore, the second resin composition can contain another component in addition to polyolefin, the other thermoplastic resin which is not a polyolefin, and the other thermoplastic elastomer which is not a polyolefin.

Examples of the other component include an antioxidant, a heat stabilizer, a weathering agent, a light stabilizer, a plasticizer, an ultraviolet absorber, an antistatic agent, a flame retardant, an auxiliary flame retardant, a slip agent, an anti-blocking agent, an anti-fogging agent, a lubricant, an antimicrobial agent, a filler (reinforcing filler), a colorant, a dispersant, a copper damage inhibitor, a neutralizer, an anti-foaming agent, a weld strength improver, a natural oil, a synthetic oil, and a wax. Only one type of these other components may be used or two or more types thereof may be used in combination. It is noted that the various types of fillers exemplified in the description of the first resin composition can be similarly used as the filler, and only one type of these fillers may be used or two or more types thereof may be used in combination.

It is only required that the intermediate layer 12 is a foamed layer formed of the second resin composition, but in particular, the intermediate layer 12 is preferably a core-back foamed layer formed by core-back foaming of the second resin composition between the design layer 11 and the back layer 13. When the intermediate layer 12 is a core-back foamed layer, it is not necessary to produce each layer separately and then bond the layers together, and thus, it is possible to eliminate a bonding step. In addition, it is not necessary to utilize an adhesive at this time. Therefore, it is possible to reduce the number of processing steps required for producing a molded body, and achieve the object of providing a mono-material molded body at a higher degree. Furthermore, a design surface of the molded body 1 has no surface irregularities, poor appearance, or the like due to swirl marks, foaming unevenness, or the like, because the foaming occurs between the design layer 11 and the back layer 13 which are formed in advance. That is, no countermeasure against surface irregularities, poor appearance, and the like of the foamed layer is needed in the core-back foaming in forming the intermediate layer 12.

The core-back foaming may be performed in any manner. For example, the core-back foamed layer can be formed by interposing the second resin composition provided with foamability, in a gap 2 between a first support layer $11_F$ to serve as the design layer 11 and a third support layer $13_F$ to serve as the back layer 13 (typically, the interposing is performed by injecting the second resin composition provided with foamability into a cavity) and then expanding the gap 2 to reduce the pressure in the gap 2 to cause the second resin composition to foam (see FIGS. 4 and 5).

The gap 2 between the first support layer $11_F$ and the third support layer $13_F$ may be expanded in any manner. For example, the gap 2 can be expanded by increasing the separation distance between the first support layer $11_F$ and the third support layer $13_F$, or can be expanded by retracting another cavity wall surface while maintaining the separation distance between the first support layer $11_F$ and the third support layer $13_F$.

A method for imparting foamability to the second resin composition is not particularly limited, and examples of the method include addition of a chemical foaming agent, addition of a physical foaming agent, and addition of both a chemical foaming agent and a physical foaming agent. Examples of the chemical foaming agent include azo compounds such as azodicarbonamide, nitroso compounds such as N,N'-dinitrosopentamethylenetetramine, and hydrazine derivatives such as 4,4'-oxybis(benzenesulfonylhydrazide). Only one type of these chemical foaming agents may be used or two or more types thereof may be used in combination.

On the other hand, examples of the physical foaming agent include water, nitrogen gas, carbon dioxide, and supercritical fluids. Examples of the supercritical fluid include inert gases such as carbon dioxide, nitrogen, argon, and helium. Only one type of these physical foaming agents may be used or two or more types thereof may be used in combination.

An expansion ratio T (times) of the intermediate layer 12 is not particularly limited, and can be, for example, $1.0 < T \leq 5.0$, $1.1 \leq T \leq 3.0$, $1.2 \leq T \leq 2.7$, or $1.3 \leq T \leq 2.5$.

(4) Back Layer

The "back layer 13" is a foamed layer and is formed of the third resin composition. The third resin composition contains a polyolefin as a main component. This means that the third resin composition includes 50 mass % or more of the polyolefin, based on the total mass (100 mass %) of the third resin composition. As long as the polyolefin which is the main component of the third resin composition has a polyolefin skeleton, the polyolefin may include any other structure without limitation. Therefore, the polyolefin which is the main component of the third resin composition may include the polyolefin included in the first resin composition, the polyolefin-based modified elastomer included in the first resin composition, and the like.

The third resin composition is not particularly limited except that the third resin composition contains a polyolefin as a main component. Therefore, as the third resin composition, a fresh polyolefin (virgin material), the above-described polyolefin-based recycled resin composition, the above-described impact-resistant resin composition, or the like can be appropriately used depending on the purpose or application.

For example, when there is no need for the back layer 13 to have any ornamental characteristics and an especially high mechanical strength such as impact resistance, a polyolefin-based recycled resin composition, a mixture of a fresh polyolefin and a polyolefin-based recycled resin composition, or the like can be used as the third resin composition, similarly to the second resin composition. That is, the third resin composition and the second resin composition can be the same (see FIG. 1).

For example, when the back layer 13 needs to have an ornamental characteristic but does not need to have an especially high mechanical strength such as impact resistance, a fresh polyolefin (virgin material) can be used as the third resin composition (see FIG. 1).

Furthermore, for example, when the back layer 13 needs to have a high mechanical strength such as impact resistance, an impact-resistant resin composition can be used as the third resin composition. That is, the third resin composition and the first resin composition can be the same (see FIG. 2).

(5) Applications of Molded Body

The applications of the molded body of the present invention are not particularly limited, but the molded body can be suitably used as various types of articles for use in vehicles such as automobiles (including two-wheeled vehicles, three-wheeled vehicles, four-wheeled vehicles, etc.), railroad vehicles, bicycles, aircrafts, and watercrafts.

Among these articles, articles for use in automobiles include exterior parts, interior parts, engine parts, and electrical parts. Specific examples of the exterior parts include roof rails, fenders, fender liners, garnishes, bumpers, door panels, roof panels, hood panels, trunk lids, fuel lids, door mirror stays, spoilers, hood louvers, wheel covers, wheel caps, grill apron cover frames, lamp bezels, door handles (pull handles), door moldings, rear finishers, wipers, engine undercovers, floor undercovers, rocker moldings, cowl louvers, and cowls.

Examples of the interior parts include: trim parts such as door trim bases (FR, RR, BACK), pockets, arm rests, switch bases, decorative panels, ornament panels, EA parts, speaker grills, and quarter trim bases; pillar garnishes; cowl side garnishes (cowl side trims); seat parts such as shields, back boards, dynamic dampers, and side airbag peripheral parts; instrument panel parts such as center clusters, registers, center boxes (doors), glove doors, cup holders, and airbag peripheral parts; center consoles; overhead consoles; sun visors; deck boards (luggage boards); undertrays; package trays; high-mount stop lamp covers; CRS covers; seat side garnishes; scuff plates; room lamps; assist grips; safety belt parts; register blades; washer levers; window regulator handles; knobs of window regulator handles; and passing light levers.

Examples of the engine parts include alternator terminals, alternator connectors, IC regulators, potentiometer bases for light dimmers, exhaust gas valves, fuel pipes, cooling pipes, brake pipes, wiper pipes, exhaust pipes, intake pipes, hoses, tubes, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad wear sensors, brake pistons, solenoid bobbins, engine oil filters, ignitor cases, and torque control levers.

Examples of the electrical parts include battery peripheral parts, air conditioner thermostats, hot air flow control valves, brush holders for radiator motors, water pump impellers, turbine vanes, wiper motor-related parts, distributors, starter switches, starter relays, transmission wire harnesses, window washer nozzles, air conditioner panel switch boards, fuel-related electromagnetic valve coils, various types of connectors such as wire harness connectors, SMJ connectors, PCB connectors, door grommet connectors, and fuse connectors, horn terminals, electrical component insulating plates, step motor rotors, lamp sockets, lamp reflectors, lamp housings, cleaner cases, filter cases, and power trains.

Furthermore, the molded body according to an embodiment of the present invention is also suitable for various types of articles and the like in non-vehicle applications other than the above-described vehicle applications. Examples of such articles include industrial materials such as transport containers, trays, transport trolleys, and other general material;

electronic parts such as connectors, coils, sensors, LED lamps, sockets, resistors, relay cases, small switches, coil bobbins, capacitors, variable capacitor cases, optical pickups, resonators, various types of terminal boards, transformers, plugs, printed circuit boards, tuners, speakers, microphones, headphones, compact motors, compact transmission gears, magnetic head bases, power modules, semiconductors, liquid crystals, FDD carriages, FDD chassis, motor brush holders, parabolic antennas, and computer-related parts;

electrical devices such as power generators, electric motors, electric transformers, current transformers, voltage regulators, rectifiers, inverters, relays, power contacts, switches, breakers, knife switches, multipole rods, and electrical part cabinets;

industrial robot bodies, nursing-care robot bodies, drone (flying objects operated by remote control, flying objects capable of autonomously flying) bodies, home appliances and office equipment such as VTR parts, television parts, irons, hair dryers, rice cooker parts, microwave oven parts, acoustic parts, audio/LD parts, CD/DVD parts, lighting parts, refrigerator parts, washing machine parts, air conditioner parts, typewriter/word processor parts, office computer parts, PCs, game machines, tablet terminals, mobile phones, smart phones, telephones and related parts, facsimile parts, copier parts, cleaning/washing devices, and motor parts;

optical and precision instruments such as cameras, timepieces, microscopes, binoculars, telescopes, and eyeglasses;

everyday items and housewares such as storage cases (e.g., food trays, storage boxes, storage trays, attache cases, suitcases, helmets, water bottles, and bottles), toiletries, writing tools, stationery, book-slides, skincare tools, utensils, tableware, laundry tools, cleaning tools, coat hangers, food containers, and lids (e.g., lids for glass bottles);

entertainment items such as toys;

machine tools/general machinery/machine parts such as mowing machine bodies, covers, power tool bodies, covers, and various types of clips;

sporting goods such as tennis racket strings, ski plates/boards, protectors (baseball, soccer, motor sports), shoes, shoe soles (shoe soles, soles for sports shoes), outdoor/climbing tools;

furniture-related items such as costume cases, tables, chairs, shoe boxes, kitchen utensils, toilet room goods, and bathroom goods;

housing and civil engineering-related articles such as interior and exterior walls/roofs, heat insulating materials, door-related parts, window material-related parts, floor material-related parts, seismic isolating/damping parts, shutters, gutters, water supply and sewage drainage-related parts (lifeline-related parts), parking garages, gas and power supply-related parts (lifeline-related parts), civil engineering parts, traffic signals, road signs, pylons, center poles, guardrails (guard wires), and equipment for construction works;

medical supplies such as mouthpieces, medical equipment, and drug containers;

clothing items such as shoes; and agriculture-, forestry-, and fishery-related items such as agricultural machinery, farming tools, flowerpots (planters), fishing gear, marine culture-related tools, and tools for forestry industry.

[2] Method of Recycling Molded Body

A method of recycling the molded body according to an embodiment of the present invention is characterized by including a segmentize step of segmentizing the molded body 1 to obtain a polyolefin-based recycled resin.

As described above, the molded body 1 according to an embodiment of the present invention includes the design layer 11 being a non-foamed layer, the intermediate layer 12 being a foamed layer, and the back layer 13 being a non-foamed layer, which are laminated in this order, and the design layer 11, the intermediate layer 12, and the back layer 13 are respectively formed of the first resin composition, the second resin composition, and the third resin composition each containing a polyolefin as a main component. Therefore, by segmentizing the molded body 1, the molded body 1 can be directly reused as a polyolefin-based recycled resin. In particular, it is preferable to use, as a raw material of the polyolefin-based recycled resin, a molded body including only the design layer 11, the intermediate layer 12, and the back layer 13.

If necessary, the segmentized pieces of the molded body 1 can be subjected to melt-kneading to homogenize the components. That is, the recycling method can include, after the segmentize step, a melt-kneading step of melt-kneading the polyolefin-based recycled resin to obtain a polyolefin-based recycled resin composition in which the components are homogenized.

Furthermore, when the components are homogenized, the melt-kneaded resin composition may be utilized in a molten state or may be pelletized. That is, the recycling method can include, after the melt-kneading step, a pelletizing step of pelletizing the polyolefin-based recycled resin composition to produce polyolefin-based recycled pellets.

The application of the polyolefin-based recycled resin obtained by the present method (as well as the polyolefin-based recycled resin composition and the polyolefin-based recycled pellets) is not particularly limited. For example, the polyolefin-based recycled resin (as well as the polyolefin-based recycled resin composition and the polyolefin-based recycled pellets) can be used as the second resin composition or as a raw material of the second resin composition. Similarly, the polyolefin-based recycled resin obtained by the present method can be used as the third resin composition or as a raw material of the third resin composition.

[3] Method of Producing Molded Body

Figure 4:
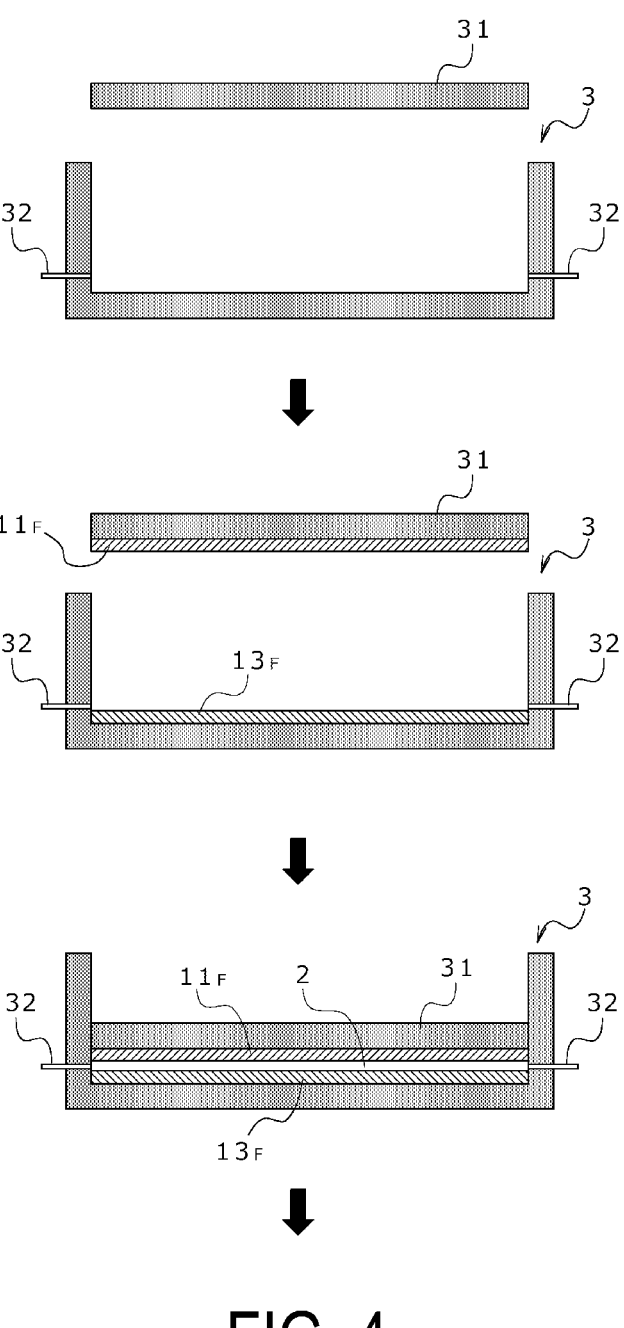
FIG. 4 is an explanatory view illustrating a disposing step in a method of producing the molded body and a recycling method.
Figure 5:
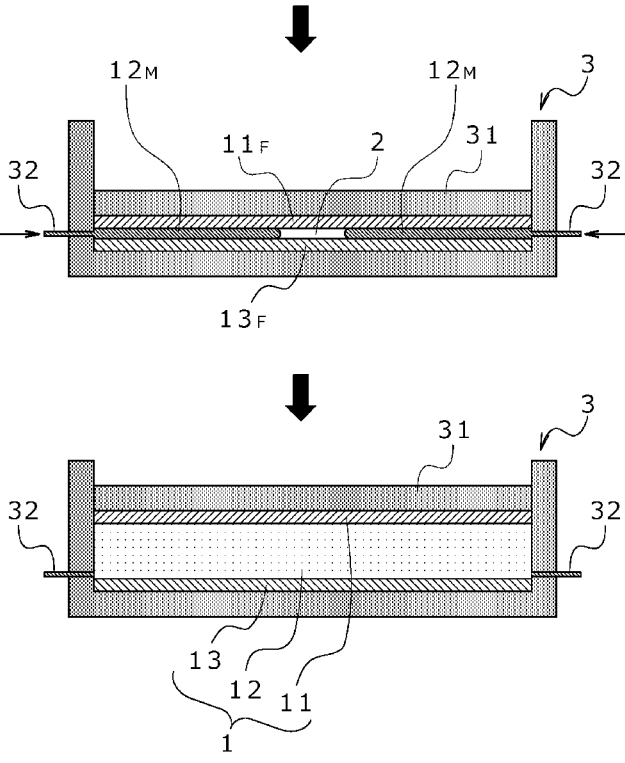
FIG. 5 is an explanatory view illustrating an interposing step and an intermediate layer forming step in the method of producing the molded body and the recycling method.

A method of producing the molded body according to an embodiment of the present invention is characterized by including a disposing step of disposing the first support layer $11_F$ to serve as the design layer 11 and the third support layer $13_F$ to serve as the back layer 13 in a state where the first support layer $11_F$ and the third support layer $13_F$ are spaced apart from each other and face each other, an interposing step of interposing the second resin composition $12_M$ provided with foamability in the gap 2 between the first support layer $11_F$ and the third support layer $13_F$, and an intermediate layer forming step of forming the intermediate layer 12 by expanding the gap 2 while causing the second resin composition $12_M$ to foam (see FIGS. 4 and 5).

That is, the intermediate layer forming step is a step of expanding the gap 2 formed by the first support layer $11_F$ and the third support layer $13_F$ to cause core-back foaming of the second resin composition. If the intermediate layer 12 is formed by core-back foaming in this manner, it is not necessary to produce each layer separately and then bond the layers together. That is, although the molded body 1 can be obtained by separately forming the design layer 11, the intermediate layer 12, and the back layer 13 and then bonding the layers together, such a bonding step is not required for the method according to of the present invention. In addition, it is not necessary to utilize an adhesive at this time. Therefore, it is possible to reduce the number of processing steps required for producing a molded body, and achieve the object of providing a mono-material molded body at a higher degree.

Alternatively, the design layer 11 and the back layer 13 can be formed as skin layers of the intermediate layer 12 which are formed during foaming of the intermediate layer 12 (in this case, both of the design layer 11 and the back layer 13 are formed of the second resin composition). However, in the present method, the design layer 11 and the back layer 13 formed in advance are used, and the foaming occurs between the design layer 11 and the back layer 13 (in the gap 2). As a result, the design surface of the molded body 1 has no surface irregularities, poor appearance, or the like due to swirl marks, foaming unevenness, or the like. Thus, no countermeasure against surface irregularities, poor appearance, and the like of the foamed layer is needed in forming the intermediate layer 12.

The core-back foaming may be performed in any manner, and can be performed as follows, for example. The first support layer $11_F$ and the third support layer $13_F$ may be fixed in a mold 3 including a movable wall 31 capable of core-back operation, to allow the first support layer $11_F$ and the third support layer $13_F$ to be spaced apart from and face each other, and thus the gap 2 is formed between the first support layer $11_F$ and the third support layer $13_F$. This step is the disposing step described above.

Thereafter, the second resin composition provided with foamability is injected into the gap 2 (for example, injected into the mold 3 through an injection port 32), and thus the second resin composition in a foamable state is interposed in the gap 2. This step is the interposing step described above.

Next, the movable wall 31 is retracted to increase the volume of the gap 2 to reduce the pressure in the gap 2, whereby core-back foaming of the second resin composition can be caused. This step is the above-described intermediate layer forming step.

By causing core-back foaming of the second resin composition between the first support layer $11_F$ and the third support layer $13_F$, the intermediate layer 12 is welded to the first support layer $11_F$ and the third support layer $13_F$ while the intermediate layer 12 is formed. Therefore, an adhesive or the like for bonding these three layers is not required. In addition, a step of bonding these three layers is also not required.

The above-described intermediate layer forming step may be performed after completion of the above-described interposing step, the intermediate layer forming step may be started after the start of the interposing step and before the end of the interposing step, or the interposing step and the intermediate layer forming step may be performed substantially simultaneously.

Of course, the movable wall 31 may be a wall on which the first support layer $11_F$ and/or the third support layer $13_F$ are disposed, or may be a wall on which the first support layer $11_F$ and/or the third support layer $13_F$ are not placed. The method of imparting foamability to the second resin composition is as described above.

A method of molding the support layer $11_F$ and the support layer $13_F$ is not particularly limited, and any known molding method can be used. Specific examples of the molding method include injection molding, extrusion molding (sheet extrusion), die molding, vacuum molding, compression molding, press molding, stamping molding, and transfer molding. Only one of these methods may be used or two or more thereof may be used.

[4] Method of Recycling Polyolefin-based Resin Composition

A method of recycling a polyolefin-based resin composition according to an embodiment of the present invention is characterized in that the method includes a disposing step of disposing the first support layer $11_F$ formed of a first resin composition including a polyolefin, a polyamide, and a polyolefin-based modified elastomer, and the third support layer $13_F$ formed of a third resin composition containing a polyolefin as a main component, in a state where the first support layer $11_F$ and the third support layer $13_F$ are spaced apart from each other and face each other, an interposing step of interposing a polyolefin-based recycled resin composition provided with foamability in the gap between the first support layer $11_F$ and the third support layer $13_F$, and an intermediate layer forming step of forming an intermediate layer by expanding the gap 2 between the first support layer $11_F$ and the third support layer $13_F$ while causing the polyolefin-based recycled resin composition to foam, and thereby producing the molded body 1 including the design layer 11, the intermediate layer 12, and the back layer 13 laminated in this order, the design layer 11 being a non-foamed layer formed by the first support layer $11_F$, the intermediate layer 12 being a foamed layer, and the back layer 13 being a non-foamed layer formed by the third support layer $13_F$ (see FIGS. 4 and 5).

This recycling method is different from the above-described method of producing a molded body in that the second resin composition in the method of producing a molded body is limited to the polyolefin-based recycled resin composition. The polyolefin-based recycled resin composition is as described above in [1] (3).

The present recycling method in which a polyolefin-based recycled resin composition is used can achieve an effect similar to that in the above-described method of producing a molded body. That is, the intermediate layer forming step is a step of expanding the gap 2 formed by the first support layer $11_F$ and the third support layer $13_F$ to cause core-back foaming of the polyolefin-based recycled resin composition. When the intermediate layer 12 is formed by core-back foaming in this manner, it is not necessary to produce each layer separately and then bond the layers together. That is, although the molded body 1 can be obtained by separately forming the design layer 11, the intermediate layer 12, and the back layer 13 and then bonding the layers together, such a bonding step is not required for the method according to an embodiment of the present invention. In addition, it is not necessary to utilize an adhesive at this time. Therefore, it is possible to reduce the number of processing steps required for producing a molded body, and achieve the object of providing a mono-material molded body at a higher degree.

Alternatively, the design layer 11 and the back layer 13 can be formed as skin layers of the intermediate layer 12 which are formed during foaming of the intermediate layer 12 (in this case, both of the design layer 11 and the back layer 13 are formed of the second resin composition). However, in the present recycling method, the design layer 11 and the back layer 13 formed in advance are used, and foaming occurs between the design layer 11 and the back layer 13 (in the gap 2). As a result, the design surface of the molded body 1 has no surface irregularities, poor appearance, or the like due to swirl marks, foaming unevenness, or the like. Thus, no countermeasure against surface irregularities, poor appearance, and the like of the foamed layer is needed in forming the intermediate layer 12.

The above-mentioned examples are for illustrative purposes only and are not to be construed as limiting the invention. While the invention has been described by way of examples of typical embodiments, it is understood that the language used in the description and illustration of the invention is to be regarded as explanatory and illustrative and not restrictive. Modifications within the scope of the appended claims are possible without departing from the scope or spirit of the invention in its form as detailed herein. Although reference has been made herein to specific structures, materials and examples in the detailed description of the invention, it is not intended to limit the invention to the disclosure set forth herein, but rather, to cover all functionally equivalent structures, methods, and uses within the scope of appended claims.

The invention claimed is:

1. A molded body comprising a design layer, an intermediate layer, and a back layer laminated in this order, the design layer and the back layer each being a non-foamed layer, and the intermediate layer being a foamed layer, wherein:

the design layer, the intermediate layer, and the back layer are respectively formed of a first resin composition, a second resin composition, and a third resin composition, the first resin composition is a newly produced impact-resistant resin composition including a polyolefin, a polyamide, and a polyolefin-based modified elastomer having a reactive group that reacts with the polyamide, the second resin composition is a polyolefin-based recycled resin composition, the third resin composition is the same as the first resin composition, the same as the second resin composition, or a newly produced polyolefin, and the first resin composition, the second resin composition, and the third resin composition include a polyolefin in an amount of 50 mass % or more based on a total mass of each resin composition, and the design layer is free of the polyolefin-based recycled resin composition.

2. The molded body according to claim 1, wherein the intermediate layer is a foamed layer formed by core-back foaming of the second resin composition between the design layer and the back layer.

3. The molded body according to claim 2, wherein the third resin composition is the same as the first resin composition.

4. The molded body according to claim 1, wherein the third resin composition is the same as the first resin composition.

5. A method of recycling the molded body described in claim 1, the method comprising:

segmentizing the molded body to obtain a polyolefin-based recycled resin.

6. A method of producing a molded body, the method comprising:

disposing a first support layer and a third support layer in a state where the first support layer and the third support layer are spaced apart from each other and face each other, the first support layer being formed of a first resin composition, and the third support layer being formed of a third resin composition;

interposing a second resin composition provided with foamability in a gap between the first support layer and the third support layer; and forming an intermediate layer by expanding the gap while causing the second resin composition to foam, and thereby producing a molded body including a design layer, the intermediate layer, and a back layer laminated in this order, the design layer being a non-foamed layer formed by the first support layer, the intermediate layer being a foamed layer, and the back layer being a non-foamed layer formed by the third support layer, wherein:

the first resin composition is a newly produced resin composition including a polyolefin, a polyamide, and a polyolefin-based modified elastomer having a reactive group that reacts with the polyamide, the second resin composition is a polyolefin-based recycled resin composition, the third resin composition is the same as the first resin composition, the same as the polyolefin-based recycled resin composition, or a newly produced polyolefin, and the first resin composition, the second resin composition, and the third resin composition include a polyolefin in an amount of 50 mass % or more based on a total mass of each resin composition, and the design layer is free of the polyolefin-based recycled resin composition.

* * * * *